(12) United States Patent
Armbruster, Jr. et al.

(10) Patent No.: US 11,841,305 B2
(45) Date of Patent: Dec. 12, 2023

(54) SYSTEM, DEVICE AND METHOD FOR EFFECTIVE DEPLOYMENT OF A DUST ACCUMULATION SENSOR

(71) Applicant: Industrial Intelligence, Inc., Williamsburg, VA (US)

(72) Inventors: George T Armbruster, Jr., Williamsburg, VA (US); Ali S. Rangwala, East Lyme, CT (US); Laurence E. Moulis, Charlottesville, VA (US); Shane Diller, Richmond, VA (US)

(73) Assignee: Industrial Intelligence, Inc., Williamsburg, VA (US)

( * ) Notice: Subject to any disclaimer, the term of this patent is extended or adjusted under 35 U.S.C. 154(b) by 0 days.

(21) Appl. No.: 17/895,197

(22) Filed: Aug. 25, 2022

(65) Prior Publication Data

US 2023/0073484 A1 Mar. 9, 2023

Related U.S. Application Data

(60) Provisional application No. 63/236,737, filed on Aug. 25, 2021.

(51) Int. Cl.
*G01N 15/02* (2006.01)
*G01N 21/88* (2006.01)

(52) U.S. Cl.
CPC ..... *G01N 15/0227* (2013.01); *G01N 21/8851* (2013.01); *G01N 2021/8887* (2013.01)

(58) Field of Classification Search
CPC ....... G01N 15/0227; G01N 2021/8887; G01N 21/8851; G01N 15/0606; G01N 15/0612;
(Continued)

(56) References Cited

U.S. PATENT DOCUMENTS 6,392,738 B1 5/2002 van de Pasch et al.
6,850,328 B1 2/2005 Leirfall
(Continued)

FOREIGN PATENT DOCUMENTS

GB 2422202 7/2006

OTHER PUBLICATIONS

International Searching Authority, International Search Report and Written Opinion, International Patent Application No. PCT/US22/41463, dated Nov. 22, 2022.
(Continued)

*Primary Examiner* — Tri T Ton
(74) *Attorney, Agent, or Firm* — Williams Mullen; Thomas F. Bergert

(57) ABSTRACT

A system, device and method for deployment of one or more dust accumulation sensors receives a baseline measurement associated with no accumulation of dust in a target environment, receives a time-elapsed measurement associated with positive accumulation of dust in the target environment, determines a quantity of accumulated dust in the target environment based on the baseline measurement and the time-elapsed measurement, generates a spatial dust deposition distribution for the target environment based on the determined quantity of accumulated dust and determines a deployment for one or more dust accumulation sensors for the target environment based on the spatial dust deposition distribution.

22 Claims, 5 Drawing Sheets

(58) Field of Classification Search
CPC .. G01N 2015/0096; G01N 5/00; B65G 1/137; G01K 1/02; G06Q 10/06315; G06Q 10/087; G16Y 40/10
USPC ............... 356/237.1–237.6, 239.1–239.8
See application file for complete search history.

(56) References Cited

U.S. PATENT DOCUMENTS

| | | | |
|---|---|---|---|
| 9,529,086 B2* | 12/2016 | Taoka | G01N 15/06 |
| 2011/0058167 A1* | 3/2011 | Knox | H04N 7/18 |
| | | | 356/338 |
| 2015/0205299 A1 | 7/2015 | Schnittman | |
| 2019/0204851 A1 | 4/2019 | Afrouzi et al. | |
| 2019/0391075 A1 | 12/2019 | Herrero et al. | |
| 2020/0053248 A1* | 2/2020 | Ozawa | G01N 21/94 |
| 2021/0107040 A1* | 4/2021 | Violetta | B08B 3/041 |
| 2021/0164771 A1 | 6/2021 | Noël | |
| 2021/0199554 A1 | 7/2021 | Armbruster et al. | |

OTHER PUBLICATIONS

International Search Authority/US, International Search Report and Written Opinion for International Application No. PCT/US22/36189, dated Oct. 17, 2022.

* cited by examiner

Fig. 3

| A | B |
| --- | --- |
| 1/32 inch | 1/32 inch |
| C | D |
| 1/128 inch | 1/64 inch |
| E | F |
| 1/320 inch | 1/320 inch |

Fig. 4

| A | | | B | | |
|---|---|---|---|---|---|
| *1 week* | *2 weeks* | *3 weeks* | *1 week* | *2 weeks* | *3 weeks* |
| 1/128 inch | 1/64 inch | 1/32 inch | 1/128 inch | 1/64 inch | 1/32 inch |
| C | | | D | | |
| *1 week* | *2 weeks* | *3 weeks* | *1 week* | *2 weeks* | *3 weeks* |
| 1/256 inch | 1/256 inch | 1/128 inch | 1/256 inch | 1/128 inch | 1/64 inch |
| E | | | F | | |
| *1 week* | *2 weeks* | *3 weeks* | *1 week* | *2 weeks* | *3 weeks* |
| 1/960 inch | 1/640 inch | 1/320 inch | 1/960 inch | 1/640 inch | 1/320 inch |

SYSTEM, DEVICE AND METHOD FOR EFFECTIVE DEPLOYMENT OF A DUST ACCUMULATION SENSOR

CROSS-REFERENCE TO RELATED APPLICATIONS

The present application claims priority to U.S. Provisional Patent Application No. 63/236,737 filed on Aug. 25, 2021, entitled "System and Method for Effective Deployment of a Dust Accumulation Sensor", the disclosure of which is incorporated by reference herein in its entirety.

TECHNICAL FIELD

The present disclosure relates to dust accumulation monitoring, and more particularly, to a system, device and method for assessing and deploying a dust accumulation sensor as applicable to various environments.

BACKGROUND

Solid particulates smaller than 420 μm (0.017 inches) capable of passing through a U.S. No. 40 standard sieve are classified as dusts (NFPA 68). Such dusts can accumulate on surfaces in various areas forming a layer. Such deposited layers of combustible dust if allowed to reach a critical thickness can form a suspension in air if disturbed by a sudden air movement or mechanical disturbance. If the concentration of this suspension in the air is 100-200 $g/m^3$, then the dust suspension creates an explosion hazard. This concentration (100-200 $g/m^3$), also called MEC or minimum explosive concentration, occurs when the dust layer deposit is 1/32 inch (size of a paperclip) to 1/16 inch thick.

Whether smaller than 420 μm or not, various particles can deposit on surfaces as a dry, powdery type substance or as a moist or wet mud-type substance that creates a hazard or reduces the efficiency of different types of operations. For example, soiling can occur on an outdoor solar panel when dust, dirt, snow, leaves, bird droppings and/or grime accumulate on the sun-facing surface of the solar panel and thereby diminish the performance of the solar panel by lowering the amount of light reaching the panel.

As a result of the above, it is advantageous to continuously and accurately measure and monitor dust deposition on surfaces. For purposes of the present disclosure, "dust" shall be understood to represent fine particles of solid matter, whether organic or inorganic, as well as dirt, grime, mud, snow, leaves, animal/bird waste and other larger solid particles that can cover a surface.

Areas where dust depositions occur can vary in many ways. For example, warehouses, storage facilities and other industrial buildings may range in size from under one thousand square feet to over one million square feet. Such buildings may also be partitioned with some areas devoted to greater dust-generating or dust buildup enabling activities than other areas. With outdoor structures, climate and environment can affect dust depositions, for example. Regardless, random or haphazard placement of dust detection and measurement devices in a target environment can result in missing areas with hazardous dust buildup and other problems.

Since the dust accumulation problem is facility-specific, dust type-specific, and process-specific, there may be significant variability between two similar facilities. Hence, a simple walkthrough, modeling, or statistical risk-based approach may not be appropriate for determining the number and placement of one or more actual dust accumulation sensors in a given environment.

As a result of the above, there is a need for a system, device and/or method to ascertain the necessary number of sensors to be deployed in or at a target environment as well as the location where such sensors should be placed.

SUMMARY

The system, device and method of the present disclosure provides a technical solution to the above issues. In various aspects, the solution as disclosed herein receives a baseline measurement associated with no accumulation of dust in a target environment, receives a time-elapsed measurement associated with positive accumulation of dust in the target environment, determines a quantity of accumulated dust in the target environment based on the baseline measurement and the time-elapsed measurement, generates a spatial dust deposition distribution for the target environment based on the determined quantity of accumulated dust and determines a deployment for one or more dust accumulation sensors for the target environment based on the spatial dust deposition distribution. Embodiments of the present disclosure thus provide an exemplary real time approach to determine the location and number of actual sensors necessary for a particular facility or environment.

BRIEF DESCRIPTION OF THE DRAWINGS

FIGS. 3 and 4 are exemplary dust deposition distribution maps in accordance with embodiments of the present disclosure.

DETAILED DESCRIPTION OF EMBODIMENTS

The foregoing and other aspects of the present disclosure will now be described in more detail with respect to the description and methodologies provided herein. It should be appreciated that the disclosure can be embodied in different forms and should not be construed as limited to the embodiments set forth herein. Rather, these embodiments are provided so that this disclosure will be thorough and complete, and will fully convey the scope of the disclosure to those skilled in the art.

The terminology used in the description of the disclosure herein is for the purpose of describing particular embodiments only and is not intended to be limiting of the disclosure. As used in the description of the embodiments of the disclosure and the appended claims, the singular forms "a", "an" and "the" are intended to include the plural forms as well, unless the context clearly indicates otherwise. For example, a sensor can include one or more sensors, a camera can include one or more cameras and so forth. Also, as used herein, "and/or" refers to and encompasses any and all possible combinations of one or more of the associated listed items.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

FIGS. 1 through 4 illustrate embodiments of a method in accordance with aspects of the present disclosure.

Figure 1:
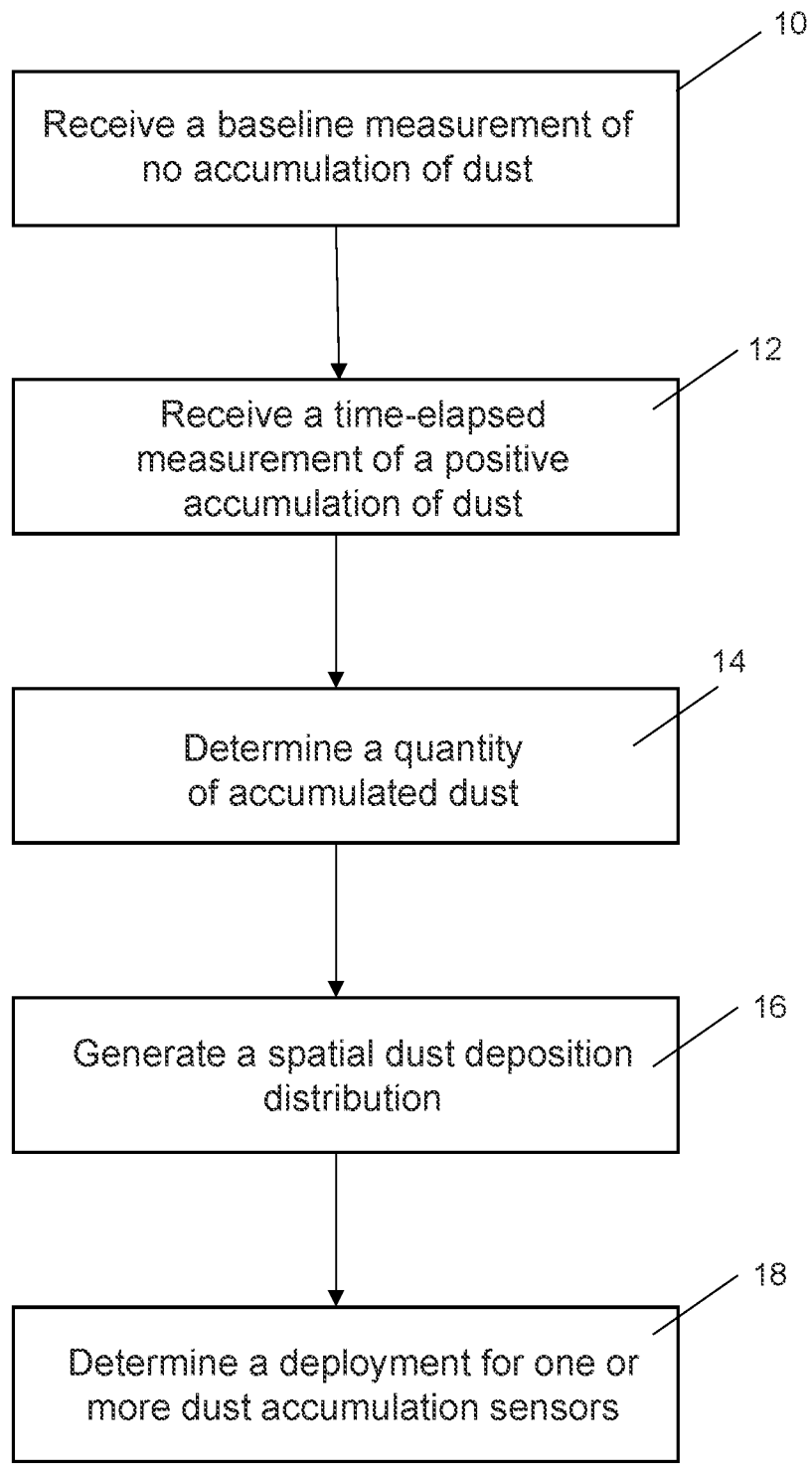
FIG. 1 is a flow diagram illustrating an exemplary method according to embodiments of the present disclosure.

As shown in FIG. 1, a process for determining an allocation of dust accumulation sensors for an environment can include, as at 10, receiving a baseline measurement associated with no accumulation of dust in a target environment. The baseline measurement can be taken and/or received in multiple ways. For example, one or more temporary dust deposition sensors can be provided and weighed, such as by a load cell with microgram sensitivity. The weight of the temporary sensor(s) is recorded and thus the weight prior to installation is the baseline measurement.

Embodiments of the temporary sensors can take the form of a cup-shaped device with attachment mechanisms such as a glue-based substance or a sticker at the base to mount on different surfaces when installed in a target environment. It will be appreciated that dust in a target environment can refer to dust on a surface in, at or for a target environment, and the target environment can be indoors or outdoors.

In another embodiment, the baseline measurement can be taken and/or received via a camera such as a microscopic camera adapted to provide micron size resolution. In various embodiments, other image capturing devices can be employed. It will be appreciated that reference to a camera herein encompasses digital cameras, analog cameras and other image capturing devices operable to capture images at the desired resolution to effectively accomplish the desired functions as described herein. The images can be captured as video or still images. The baseline measurement can be taken and/or received when a camera captures an image of a clean surface with no detectable dust. There is thus no dust level height or mass at such time. The camera can be horizontally aligned with the surface upon which the height of the dust is being measured so as to ensure accurate capture of dust as it builds vertically over the course of a given time period in a given environment. Measurements can be taken by recording the dust thickness at several locations, for example. In embodiments employing a computing device, measurements can be stored in a suitable database.

As further shown at 12 in FIG. 1, a time-elapsed measurement associated with positive accumulation of dust in the target environment is received. The time-elapsed measurement can be taken and/or received in multiple ways. For example, a temporary sensor employed as described above can be captured, sealed and re-weighed after it has been installed in the target environment for a certain period of time, presumably capturing dust. In the embodiment employing a camera, an image can be taken of the previously clean surface in the target environment after a certain period of time. While the period of time can vary, an exemplary period of time may be two to four weeks, for example.

Figure 2:
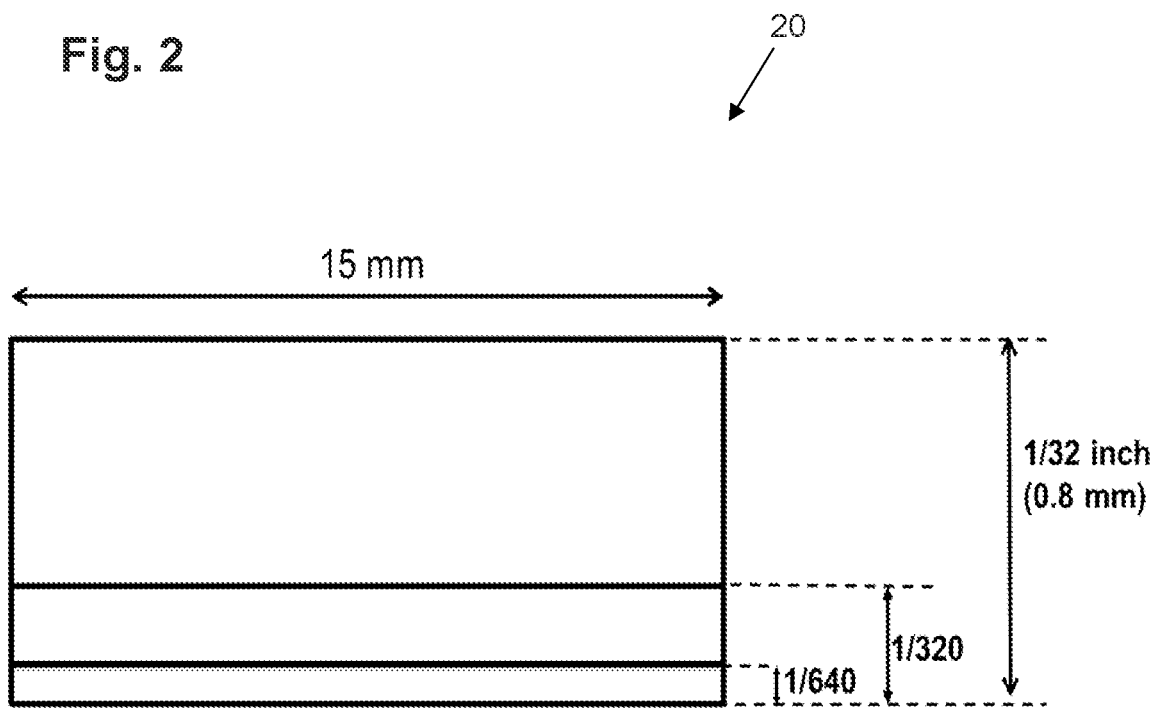
FIG. 2 is a schematic diagram showing dust layer deposits on a temporary sensor in accordance with embodiments of the present disclosure.

As at 14 in FIG. 1, a quantity of accumulated dust in the target environment based on the baseline measurement and the time-elapsed measurement can be determined. In the embodiments employing one or more temporary sensors, the quantity of accumulated dust can be determined with reference to FIG. 2. FIG. 2 is a schematic diagram 20 (not to scale) showing dust layer deposits on a temporary sensor and the implication to the placement of one or more actual dust deposition sensors. In this example, $1/32$ inch of dust can be assumed to be a dust deposition that is potentially hazardous and should not occur during normal operation of a given facility. $1/320$ inch represents $1/10^{th}$ of the threshold value and $1/640$ inch represents $1/20^{th}$ of threshold value.

While the diameter of the temporary sensor can vary, an exemplary temporary sensor may have a diameter of 15 mm, and the approximate bulk density of dust can be 0.2 mg/mm$^3$. However, it will be appreciated that bulk density can vary from 0.1 mg/mm$^3$ to 1 mg/mm$^3$. In such variations, the approach described herein can be varied accordingly. If the thickness threshold is $1/32$ inch (0.8 mm) and a temporary dust deposition sensor accumulates more than $1/10^{th}$ of the threshold ($1/320$ inch) within the time period of collection, then embodiments of the present system and method can recommend that this area (e.g., one quadrant of a target environment) should have a dust sensor, i.e., a dust accumulation sensor should be deployed in the referenced area. This translates to 3 mg in the temporary sensor that is 15 mm in diameter. The calculation details are given below:

Assuming that during the course of four weeks, the temporary sensor accumulates $1/10^{th}$ the critical thickness ($1/32$ inch or 0.8 mm), Volume of dust collected in the temporary sensor =

$$\frac{\pi}{4}(15 \text{ mm})^2 \left(0.8 \times \frac{1}{10} \text{mm}\right) = 14.2 \text{ mm}^3$$

Mass of dust collected by the temporary sensor =

$$\left(0.2 \frac{\text{mg}}{\text{mm}^3}\right)(14.2 \text{ mm}^3) = 3 \text{ mg}$$

This gives an approximate weight threshold that will be collected by the sensor in a typical facility to be monitored and controlled. It will be appreciated that the mass of dust collected by the temporary sensor may be calculated differently for different bulk densities as described above. It will further be appreciated that the volume of dust collected may be calculated differently based upon variations in the diameter of the temporary sensor(s). Accurate measurements for the temporary sensor(s) diameter can be taken, and assumptions can be made about the appropriate bulk density to employ based upon the observed or perceived packing of the dust layers (where well packed layers will likely have a higher density than 0.2 mg/mm$^3$).

Similarly, if the temporary dust deposition sensor accumulates $1/20^{th}$ of the threshold (1.5 mg), then one actual dust accumulation sensor can be placed at two quadrants of the target environment. In other words, a single dust accumulation sensor can be deployed to cover two quadrants in the target environment in this example.

If the temporary dust deposition sensor accumulates less than $1/20^{th}$ of the threshold, or less than 1.5 mg, then an actual dust deposition sensor can be placed covering a spatial area of four quadrants of the target environment. In other words, a single dust accumulation sensor can be deployed to cover four quadrants in the target environment in this example.

As another embodiment where a camera is employed, the quantity of accumulated dust in the target environment based on the baseline measurement and the time-elapsed measurement can be determined, such as by employing a scale to be captured in the images and/or averaging a height of dust captured by an image over a section of a surface area. It will be appreciated that the accumulation of dust may not appear in a horizontal form but may be uneven.

In various embodiments, the captured image of the surface can be taken to provide a particle count, wherein image processing software can be employed to assess the quantity of accumulated dust. In such case, the sensor accumulation period can be less as very few particles are needed to be deposited. A time evolution of the deposition rate can then be estimated as well, in accordance with various embodiments of the present disclosure. For example, if the deposition rate is determined to be $1/640^{th}$ inch for every three days, with all other variables held constant, the actual deposition can be predicted to be $1/320^{th}$ inch after six days, $1/160^{th}$ inch after twelve days and so forth.

With reference again to FIG. 1, as at 16, a spatial dust deposition distribution for the target environment can be generated based on the determined quantity of accumulated dust. The dust deposition distribution can be embodied as a map for the target environment that can show variation of deposition rates throughout the target environment. The dust deposition distribution can also provide a time-elapsed history profile (e.g., two week or four week) based on the data collected. FIG. 3 shows an exemplary dust deposition distribution 22 for a target environment with six segments, A, B, C, D, E and F. As can be seen, segments A and B were found to accumulate $1/32$ inch of dust, segment C was found to accumulate $1/128$ inch of dust, segment D was found to accumulate $1/64$ inch of dust, and segments E and F were found to accumulate $1/320$ inch of dust. FIG. 4 shows an exemplary dust deposition distribution 24 for a target environment with six segments A, B, C, D, E and F as a time-elapsed history profile over three weeks. As can be seen in FIG. 4, segments A and B accumulated more dust than segments C, D, E and F over time. These higher measurements may lead to the deployment of more than one dust accumulation sensors in segments A and B, for example. Thus, the spatial dust deposition across the target environment can be used as a guide to determine the placement and location of one or more actual dust accumulation sensors.

With reference to FIGS. 3 and 4, it will be appreciated that the baseline measurement can be or include a weight measurement for at least one temporary sensor in each of the plurality of grids prior to installation of the at least one temporary sensor in the plurality of grids, and the time-elapsed measurement can be or include a weight measurement for the temporary sensor in each of the plurality of grids at a time after the installation of the temporary sensor in each of the plurality of grids. It will further be appreciated that the baseline measurement can be or include a visual image of a surface in each of the plurality of grids in the target environment as captured by a camera, and the time-elapsed measurement can be or include a visual image of the surface in each of the plurality of grids in the target environment as captured by the camera. Thus, there may be a single camera in each of the grid locations A, B, C, D, E and F in the example diagrams in FIGS. 3 and 4.

As at 18 in FIG. 1, a deployment for one or more dust accumulation sensors for the target environment based on the spatial dust deposition distribution can be determined. In various embodiments, the deployment includes determining the number and location of actual dust accumulation sensors for a target environment. This determination can be made based on a time-weighted average deposition on surfaces throughout a target environment using temporary sensors as described herein.

It will be appreciated that the target environment can be divided into grids or segments, as illustrated in FIGS. 3 and 4, for example. In various embodiments, the target environment is divided into five hundred square feet grids and within each such grid area, a previously weighed temporary dust deposition sensor is placed as described elsewhere herein. In embodiments where the dust hazard class is classified as St-3 with a Kst>300, then the sizing of the grid can be reduced further to 250 square feet, for example. In some cases where dust deposition rates are negligible, a single sensor can cover a larger area.

In various embodiments, a dust hazard class for the target environment is employed. The number of grids can be determined based upon the dust hazard class. For example, the grid size can be 250 sq ft for St 3 type dust, 500 sq ft for St 2 type dust, and 1000 sq ft for St 1 type dust. The deployment for one or more dust accumulation sensors for the target environment can further be based on the dust hazard class.

In various embodiments, a dust shape and size analysis can also be performed on the accumulated dust. The size of dust deposited from different sources can be quantified if size variation is expected to be high, for example. Techniques including laser diffraction, light microscopy, scanning electron microscopy and digital cameras can be employed to assess dust particle shape and size, for example.

Figure 5:
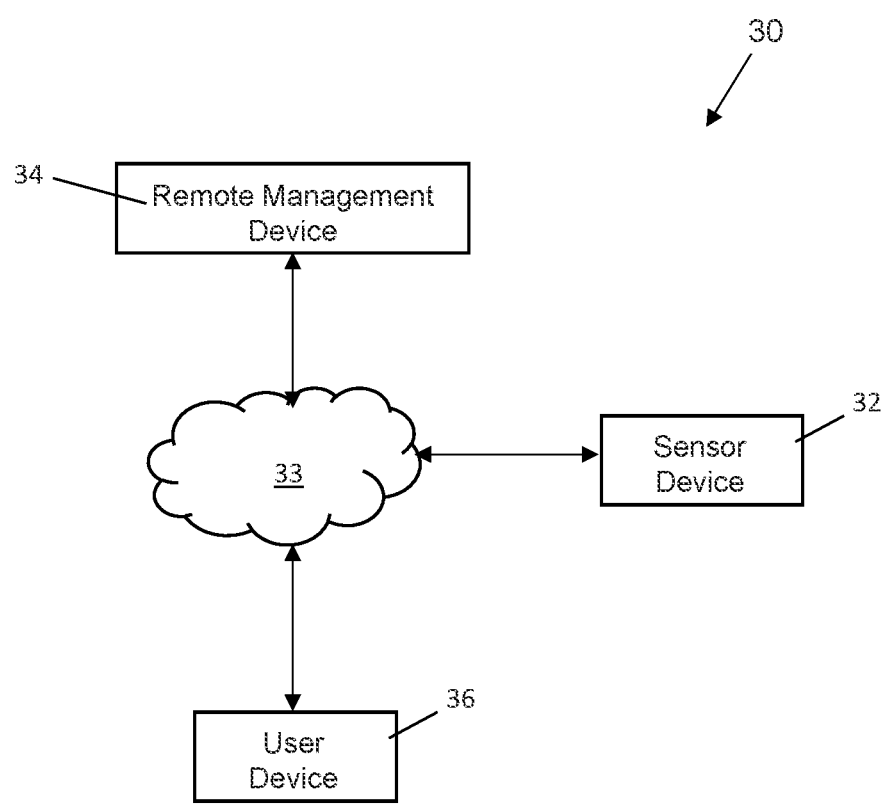
FIG. 5 is a schematic diagram of a system according to embodiments of the present disclosure.

As shown in FIG. 5, a system 30 in accordance with the present disclosure can include a sensor device 32, which can be a temporary sensor or an image capturing device as described above. The sensor device 32 can communicate with a remote management device 34 via network 33. The remote management device 34 can receive the baseline and time-elapsed measurements, either via direct communication from the sensor device 32 or by indirect collection and entry of such measurements into the remote management device 34. It will be appreciated that the remote management device 34 can be a computing device that is located on site at the target environment or located remotely from the target environment. It will further be appreciated that the sensor device 32 can be provided with wired and/or wireless network connectivity capabilities including for example, where the sensor device 32 is a digital camera configured with a processor, memory and communications software to facilitate communicating over a network with other devices such as the remote management device 34. The remote management device 34 can incorporate a processor and a memory storing programming instructions to execute aspects of the methods as described herein. For example, the remote management device 34 can determine a quantity of accumulated dust in the target environment based on the baseline measurement and the time-elapsed measurement. The remote management device 34 can further generate the spatial dust deposition distribution for the target environment based on the determined quantity of accumulated dust. The remote management device 34 can further determine a deployment for one or more dust accumulation sensors for the target environment based on the spatial dust deposition distribution. In various embodiments, the remote management device 34 can communicate with a user device 36 located in the target environment so as to instruct the user device 36 on the deployment of one or more sensor devices such as temporary sensors, one or more cameras, and/or one or more actual dust accumulation sensors, whereupon the user device 36 or a user operating the user device 36 can then execute the deployment. In embodiments where the user device 36 itself executes the deployment, the user device 36 is a remotely operable robotic device adapted to pick up, transport and deposit physical objects such as one or more temporary sensors, one or more cameras, and/or one or more actual dust accumulation sensors.

It will be appreciated that a system according to the present disclosure can incorporate one or more processors and memory storing instructions that, when executed by the processor, carry out the functions and procedures described herein. The processor can be configured to transmit and receive data or signals representing events, messages, commands, or any other suitable information consistent with the present disclosure. The present disclosure contemplates a variety of different systems each having one or more of a plurality of different features, attributes, or characteristics. A "system" as used herein refers to various configurations of one or more computing devices, such as remote management device 34 and user device 36, which can be embodied as desktop computers, laptop computers, tablet computers, personal digital assistants, mobile phones, and other mobile computing devices.

In embodiments in which the system includes a computing device configured to communicate via a data network, the data network is a local area network (LAN), a wide area network (WAN), a public network such as the Internet, or a private network. For example, the sensor device 32, remote management device 34 and user device 36 in FIG. 5 are configured to connect to the data network 33 or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

The invention claimed is:

1. A method, comprising:
receiving a baseline measurement associated with no accumulation of dust in a target environment, wherein the baseline measurement comprises a weight measurement for a temporary sensor prior to installation of the temporary sensor in the target environment;
receiving a time-elapsed measurement associated with accumulation of dust in the target environment, wherein the time-elapsed measurement comprises a weight measurement for the temporary sensor at a time after the installation of the temporary sensor in the target environment;
determining, via a computing device, a quantity of accumulated dust in the target environment based on the baseline measurement and the time-elapsed measurement;
generating, via the computing device, a spatial dust deposition distribution for the target environment based on the determined quantity of accumulated dust; and
determining, via the computing device, a deployment for one or more dust accumulation sensors for the target environment based on the spatial dust deposition distribution.

2. The method of claim 1, further comprising dividing the target environment into a plurality of grids,
wherein the baseline measurement comprises a weight measurement for at least one temporary sensor in each of the plurality of grids prior to installation of the at least one temporary sensor in the plurality of grids, and
wherein the time-elapsed measurement comprises a weight measurement for the at least one temporary sensor in each of the plurality of grids at a time after the installation of the at least one temporary sensor in in each of the plurality of grids.

3. The method of claim 1, wherein the baseline measurement comprises a visual image of a surface in the target environment as captured by a camera, and wherein the time-elapsed measurement comprises a visual image of the surface in the target environment as captured by the camera.

4. The method of claim 3, wherein the camera is in communication with the computing device.

5. The method of claim 1, further comprising dividing the target environment into a plurality of grids,
wherein the baseline measurement comprises a visual image of a surface in each of the plurality of grids in the target environment as captured by a camera, and
wherein the time-elapsed measurement comprises a visual image of the surface in each of the plurality of grids in the target environment as captured by the camera.

6. The method of claim 5, further comprising receiving a dust hazard class for the target environment, wherein the number of grids in the plurality of grids is determined based upon the dust hazard class and wherein determining the deployment for one or more dust accumulation sensors for the target environment is further based on the dust hazard class.

7. The method of claim 1, wherein receiving a time-elapsed measurement associated with accumulation of dust in the target environment comprises receiving a time-elapsed measurement from a plurality of locations within the target environment, and
wherein determining a quantity of accumulated dust in the target environment comprises determining a time-weighted average deposition.

8. The method of claim 1, further comprising determining a size of one or more dust particles from the accumulated dust.

9. The method of claim 1, further comprising determining a shape of one or more dust particles from the accumulated dust.

10. A system, comprising:
a processor, and a memory storing instructions, that when executed by the processor, cause the processor to:
receive a baseline measurement associated with no accumulation of dust in a target environment, wherein the baseline measurement comprises a weight measurement for a temporary sensor prior to installation of the temporary sensor in the target environment;
receive a time-elapsed measurement associated with accumulation of dust in the target environment, wherein the time-elapsed measurement comprises a weight measurement for the temporary sensor at a time after the installation of the temporary sensor in the target environment;
determine a quantity of accumulated dust in the target environment based on the baseline measurement and the time-elapsed measurement;
generate a spatial dust deposition distribution for the target environment based on the determined quantity of accumulated dust; and
determine a deployment for one or more dust accumulation sensors for the target environment based on the spatial dust deposition distribution.

11. The system of claim 10, further comprising dividing the target environment into a plurality of grids,
wherein the baseline measurement comprises a weight measurement for at least one temporary sensor in each of the plurality of grids prior to installation of the at least one temporary sensor in the plurality of grids, and
wherein the time-elapsed measurement comprises a weight measurement for the at least one temporary sensor in each of the plurality of grids at a time after the installation of the at least one temporary sensor in in each of the plurality of grids.

12. The system of claim 10, wherein the baseline measurement comprises a visual image of a surface in the target environment as captured by a camera, and wherein the time-elapsed measurement comprises a visual image of the surface in the target environment as captured by the camera.

13. The system of claim 12, wherein the camera is in communication with the computing device.

14. The system of claim 10, further comprising dividing the target environment into a plurality of grids,
wherein the baseline measurement comprises a visual image of a surface in each of the plurality of grids in the target environment as captured by a camera, and
wherein the time-elapsed measurement comprises a visual image of the surface in each of the plurality of grids in the target environment as captured by the camera.

15. The system of claim 14, further comprising receiving a dust hazard class for the target environment, wherein the number of grids in the plurality of grids is determined based upon the dust hazard class and wherein determining the deployment for one or more dust accumulation sensors for the target environment is further based on the dust hazard class.

16. The system of claim 10, wherein receiving a time-elapsed measurement associated with accumulation of dust in the target environment comprises receiving a time-elapsed measurement from a plurality of locations within the target environment, and
wherein determining a quantity of accumulated dust in the target environment comprises determining a time-weighted average deposition.

17. The system of claim 10, further comprising determining a size of one or more dust particles from the accumulated dust.

18. The system of claim 10, further comprising determining a shape of one or more dust particles from the accumulated dust.

19. A method, comprising:
receiving a baseline measurement associated with no accumulation of dust in a target environment divided into a plurality of grids, wherein the baseline measurement comprises a weight measurement for at least one temporary sensor in each of the plurality of grids prior to installation of the at least one temporary sensor in the plurality of grids;
receiving a time-elapsed measurement associated with accumulation of dust in the target environment, wherein the time-elapsed measurement comprises a weight measurement for the at least one temporary sensor in each of the plurality of grids at a time after the installation of the at least one temporary sensor in in each of the plurality of grids;
determining, via a computing device, a quantity of accumulated dust in the target environment based on the baseline measurement and the time-elapsed measurement;
generating, via the computing device, a spatial dust deposition distribution for the target environment based on the determined quantity of accumulated dust; and
determining, via the computing device, a deployment for one or more dust accumulation sensors for the target environment based on the spatial dust deposition distribution.

20. A method, comprising:
receiving a baseline measurement associated with no accumulation of dust in a target environment, wherein the baseline measurement comprises a visual image of a surface in each of the plurality of grids in the target environment as captured by a camera;
receiving a time-elapsed measurement associated with accumulation of dust in the target environment, wherein the time-elapsed measurement comprises a visual image of the surface in each of the plurality of grids in the target environment as captured by the camera;
determining, via a computing device, a quantity of accumulated dust in the target environment based on the baseline measurement and the time-elapsed measurement;
generating, via the computing device, a spatial dust deposition distribution for the target environment based on the determined quantity of accumulated dust; and
determining, via the computing device, a deployment for one or more dust accumulation sensors for the target environment based on the spatial dust deposition distribution.

21. A system, comprising:
a processor, and a memory storing instructions, that when executed by the processor, cause the processor to:
receive a baseline measurement associated with no accumulation of dust in a target environment divided into a plurality of grids, wherein the baseline measurement comprises a weight measurement for at least one temporary sensor in each of the plurality of grids prior to installation of the at least one temporary sensor in the plurality of grids;
receive a time-elapsed measurement associated with accumulation of dust in the target environment, wherein the time-elapsed measurement comprises a weight measurement for the at least one temporary sensor in each of the plurality of grids at a time after the installation of the at least one temporary sensor in in each of the plurality of grids;
determine a quantity of accumulated dust in the target environment based on the baseline measurement and the time-elapsed measurement;
generate a spatial dust deposition distribution for the target environment based on the determined quantity of accumulated dust; and
determine a deployment for one or more dust accumulation sensors for the target environment based on the spatial dust deposition distribution.

22. A system, comprising:
a processor, and a memory storing instructions, that when executed by the processor, cause the processor to:
receive a baseline measurement associated with no accumulation of dust in a target environment, wherein the baseline measurement comprises a visual image of a surface in each of the plurality of grids in the target environment as captured by a camera;
receive a time-elapsed measurement associated with accumulation of dust in the target environment, wherein the time-elapsed measurement comprises a visual image of the surface in each of the plurality of grids in the target environment as captured by the camera;
determine a quantity of accumulated dust in the target environment based on the baseline measurement and the time-elapsed measurement;

generate a spatial dust deposition distribution for the target environment based on the determined quantity of accumulated dust; and
determine a deployment for one or more dust accumulation sensors for the target environment based on the spatial dust deposition distribution.

\* \* \* \* \*